Patented May 30, 1944

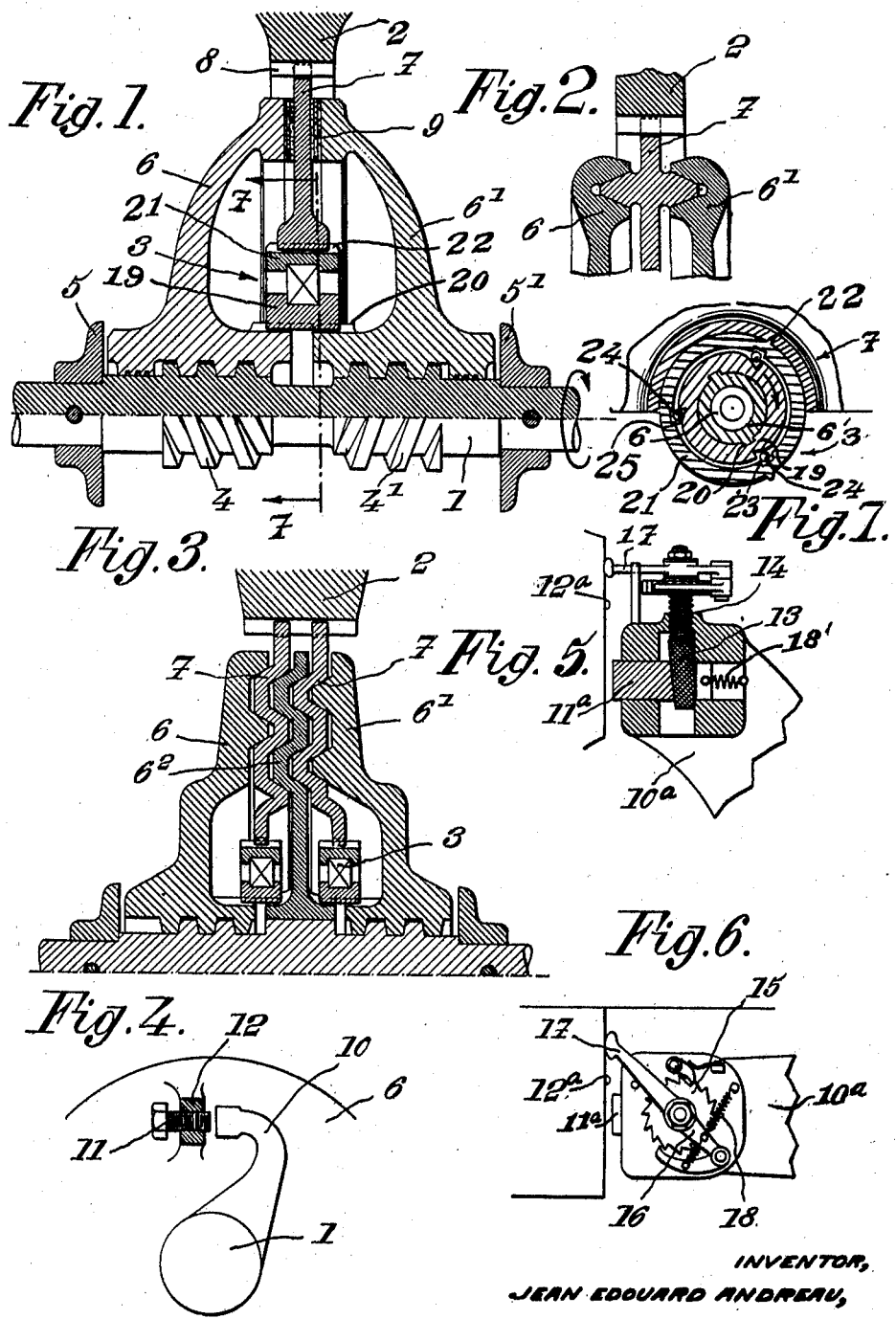

2,349,925

UNITED STATES PATENT OFFICE 2,349,925

ONE-WAY CLUTCH MECHANISM

Jean Edouard Andreau, Daurat, near Leognan, France; vested in the Alien Property Custodian Application April 17, 1940, Serial No. 330,112
In Luxemburg April 15, 1939

7 Claims. (Cl. 192—41)

The present invention relates to mechanism interposed between elements at least one of which is rotary, whereby any relative rotation of the elements in one direction is prevented, and free relative rotation thereof is permitted to take place in the opposite direction.

The primary object of the present invention is to provide a mechanism of the type above described which is better adapted to meet the requirements of practice, and which is stronger than those heretofore employed.

Other objects and advantages of the present invention will appear in the following detailed description and the drawing wherein some specific embodiments are set forth for illustration.

In the drawing:

Fig. 1 is an axial section view, the lower half of the structure being omitted, of a friction clutch according to the invention;

Fig. 2 is a fragmentary axial sectional view showing a modified form of friction clutch;

Fig. 3 is a view, similar to Fig. 1, showing another modified form of friction clutch;

Fig. 4 is a diagrammatic end view showing an alternative form of the stops 5, 5' of Figure 1;

Fig. 5 is a sectional and elevational view of modification of the device of Figure 4;

Fig. 6 is a top plan view of Fig. 5;

Figure 7 is a fragmentary vertical transverse sectional view taken through Figure 1 along the line 7—7 and looking toward the left in the direction of the arrows.

Referring in detail to the drawing and first to Figure 1 thereof, according to the essential feature of the present invention, I interpose, between shaft 1 and wheel 2 (or an element rigid in rotation with said wheel) a self-acting friction clutch device which is controlled by a one-way roller clutch 3 in such manner that the latter produces the engagement of the friction clutch mechanism when shaft 1 is turning in the direction of the arrow (in Figure 1) and, on the contrary, causes said friction clutch device to be released when said shaft is turning in the opposite direction.

As soon as shaft 1 starts rotating with respect to the wheel 2, in the direction of the arrow, the self-acting friction clutch is brought into play in such manner as to couple the wheel 2 and shaft 1 together, and to disengage them from each other when the relative rotation of the shaft 1 is in the opposite direction, to permit wheel 2 to continue to rotate, for instance by inertia, if desired after shaft 1 has stopped rotating.

It will be readily understood that the described mechanism is particularly strong because of the fact that the one-way roller clutch 3 (which is a relatively delicate part) acts only as pilot to bring the clutch device into operation, so that at least the major part of the driving torque transmitted to the wheel 2 passing through the device is under the control of said clutch. Such a result can easily be obtained by giving the contacting surfaces of the self-acting friction clutch device dimensions which are sufficient for obtaining acceptable values of the loads per unit of area imposed upon said surfaces when they serve to produce the drive of wheel 2.

Of course, there are many possible embodiments of the mechanism above described within the scope of my invention, but I have found that it is particularly advantageous, for practical purposes, to make use of the particular arrangement which will now be described:

In Figure 1, the shaft 1 is provided with two threaded parts 4 and $4^1$ having opposed threads, and corresponding abutments 5 and $5^1$ on opposite sides of said threaded parts.

On these threaded parts, I mount corresponding discs or plates 6 and $6^1$ having screw-threaded hubs adapted to cooperate with said threaded parts.

These plates 6 and $6^1$ are adapted to come into contact with either of the two following elements:

a. Either a disc 7 located between said plates and adapted to turn together with wheel 2 relative to the plates, said disc 7 being advantageously coupled with said wheel through splines 8 which permit a certain amount of relative axial sliding displacements of wheel 2 and disc 7;

b. Or with the abutments 5 and $5^1$, the directions of screw threads 4 and $4^1$ being chosen so that when shaft 1 turns in the direction of the arrow, while the plates 6 and $6^1$ are held stationary in any way, even merely by inertia, said screw threads tend to move plates 6 and $6^1$ toward each other, so as to hold disc 7 tightly between them, and that, when said shaft turns in the opposite direction, the screw threads tend to move said plates away from each other and to bring them back toward abutments 5 and $5^1$, this latter position corresponding to the uncoupling of shaft 1 and wheel 2.

Finally, I interpose, between disc 7 and the hubs of plates 6 and $6^1$, a one-way roller clutch 3, on which the disk 7 is slidably splined to permit certain axial relative displacements of these parts. The direction of operation of said roller clutch is such that it opposes the rotation of plates 6 and $6^1$ with respect to disc 7 only in the direction of the arrow, that is to say in the direction in which wheel 2 is driven.

The one-way roller clutch 3, as shown in Figure 7, comprises the inner annulus 19 which is splined at 20 to plates 6, 6¹ and the outer annulus which is splined at 22 in the hub of the wheel 7. The outer annulus 21 which is concentrically spaced from the inner annulus 19 has pockets 23 formed in its inner surface to hold the balls or rollers 24 which project into the space between the inner and outer annuli. The outer surface of the inner annulus 19 is formed, at intervals corresponding to the pockets 23, with wedge-shaped recesses 25 in which the balls or rollers 24 wedge when the inner annulus 19 is turned relative to the outer annulus 21 in the direction of the arrow.

The mechanism above described operates in the following manner, wheel 2 being supposed to be at rest, due to inertia or load thereon:

When shaft 1 starts to rotate in the direction of the arrow, the roller clutch 3 prevents plates 6 and 6¹ from being driven by friction in the direction of this movement due to resistance to movement by wheel 2. Under the action of the screw threaded parts 4 and 4¹, the plates then move toward each other until they grip disc 7 tightly between them. As soon as the friction between the contacting surfaces of the disc and the plates is sufficient, wheel 2 is driven in rotation.

Any increase of angular acceleration imposed on shaft 1 in the direction of the arrow will increase the pressure with which plates 6 and 6¹ are applied against disc 7. On the other hand, a decrease of speed of said shaft 1 will cause the plates to recede from the discs 7 and they will finally come into contact with the abutments 5 and 5¹.

It follows from the foregoing explanations that the driving torque transmitted to wheel 2 acts chiefly on the plates 6, 6¹ and the screw-threaded parts 4 and 4¹, while the one-way roller clutch 3 serves merely to prevent the plates from being driven in rotation by shaft 1, by friction between the shaft and the plates, when the shaft starts rotating in the direction of the arrow.

It should be noted that plates 6, 6¹ have a tendency, due to inertia, to perform the tightening and releasing movements above mentioned when variations in the direction of the angular acceleration of shaft 1 take place. It follows that the work to be performed by the roller clutch 3 is always very small and without any relation to the considerable stresses which are produced in the self-acting friction clutch mechanism proper.

On the other hand, it will be readily understood that the bulk of the mechanism described can be reduced by increasing the value of the tangential friction coefficient of the active friction clutch surfaces.

For this purpose, the following arrangements, given merely by way of example, may be employed:

I interpose, between plates 6, 6¹ and disc 7, linings 9, either dry or working in oil;

Alternately, according to a modification illustrated by Fig. 2, I give the contacting surfaces of plates 6 and 6¹ on the one hand, and of disc 7, on the other hand, a shape corresponding to V grooves.

According to still another embodiment, illustrated by Fig. 3, I cause plates 6 and 6¹ on the one hand, and disc 7, on the other hand, to co-operate together through the medium of a plurality of discs similar to those used in ordinary disc clutches. Some of these discs, such as shown at 7 are adapted to turn together with wheel 2 while the others, such as 6² are adapted to turn together with plates 6 and 6¹.

In all cases, with the mechanism above described, it is necessary to provide for a certain amount of axial displacement of the plates in order to obtain the effective release or disengagement thereof, this displacement varying with the state of wear of the linings of the clutch device.

Now, it may be advantageous to have a constant value of this displacement, whereby the angle through which shaft 1 is to turn for applying plates 6 and 6¹ tightly against disc 7 is also maintained constant.

In order to permit the adjustment which ensures this result, I may substitute, for the fixed abutments 5 and 5¹, adjustable abutments constituted for instance by arms 10 (Fig. 4) fixed on the shaft 1 and adapted to cooperate with adjustable abutments 11 mounted in projections 12 provided, for this purpose, on plates 6 and 6¹, the relative movement permitted corresponding to the amount of operation of the mechanism taking place before the arms 10 engage the abutments 11, from a withdrawn position of the arms.

Although the adjustment of the amplitude of this relative movement can be obtained manually, I have found that it is preferable to provide this adjustment automatically where this amplitude exhibits a tendency to increase continuously.

With this object in view, I have recourse, for instance, to the arrangement illustrated by Figs. 5 and 6.

According to this embodiment, the arm 10ª carries the movable contact piece 11ª through which the plates 6 and 6¹ are to cooperate by contact with the arm 10ª.

This contact piece 11ª comprises a block mounted slidably against the action of a return spring 18' which yieldingly opposes movement of the piece in the arm 10ª in the direction of taking up of the play between the friction elements. The displacement of piece 11ª is produced by a non-reversible wedge 13, itself controlled by a screw 14, also non-reversible.

The head of the screw 14 is fitted with a ratchet wheel 15 the pawl carrier 16 of which is provided with a finger 17. A spring 18 tends constantly to apply the finger against the projection 12ª, with which the piece 11ª is to coact.

This automatic device operates in the following manner:

As long as the amplitude of the play between the friction elements of the clutch is such that the pawl cannot move past one tooth of the ratchet wheel 15, screw 14 remains stationary. However, the screw 14 is rotated through an angle corresponding to the interval between two adjacent teeth of the ratchet wheel, when the amplitude of the play between the friction elements increases to an extent that the pawl can move past the next tooth of the ratchet wheel, at the next operation of the mechanism. This drives the wedge and the abutment 11ª is moved forwardly a distance sufficient to take up the play represented by the amount of movement of the arm 10ª before it engaged the abutment 11ª.

In general, while I have, in the above description, disclosed what I deem to be practical and efficient embodiments of the present invention, it should be well understood that I do not wish to be limited thereto since changes can be made in the arrangement, disposition and form of the parts without departing from the principle of the present invention as comprehended within the scope of the appended claims.

What I claim is:

1. A one-way drive between two elements adapted to turn freely with respect to each other in one direction and to be locked angularly for the opposite direction of relative rotation, which comprises, in combination, a part carried by one of said elements in fixed angular relation thereto, a part movably carried by the other element, said parts having cooperating clutch means, one-way clutch means interposed between said parts adapted to prevent rotation with respect to each other in the direction of drive, and cooperating means carried by said other element and the second mentioned part for moving said second mentioned part into clutching engagement with the first mentioned part and angularly locking it with respect to said other element when said elements are relatively rotated to render the one-way clutch means effective.

2. A one-way drive between two elements adapted to turn freely with respect to each other in one direction and to be angularly locked with respect to each other for the opposed direction of relative direction, which comprises, in combination, a disc coaxially carried by one of said elements in fixed angular relation thereto, a plate movably carried by the other element in coaxial relation thereto, said disc and said plate being adapted to coact together in clutch-like fashion, one-way clutch means interposed between said plate and said disc adapted to prevent their rotation with respect to each other in the direction of drive, and cooperating screw threads carried by said plate and said other element, respectively, adapted to cause said plate to move axially into clutch engagement with said disc when said elements are relatively rotated to render the one-way clutch means effective, said screw threads further preventing angular movement of said plate with respect to said other element when said plate and said disc are in engagement with each other.

3. A mechanism according to claim 2 further including stop means between said other element and said plate for limiting the relative rotation therebetween so as to limit axial movement of said plate away from said disc.

4. A mechanism according to claim 2 further including stop means including an adjustable abutment between said other element and said plate for limiting the relative rotation therebetween so as to limit axial displacement of said plate away from said disc.

5. A mechanism according to claim 2 further including stop means including an adjustable abutment between said other element and said plate for limiting the relative rotation therebetween so as to limit axial displacement of said plate away from said disc, and means for automatically effecting adjustment of said abutment in response to the actual displacements of said plate with respect to said other element, in such manner as to maintain said displacements constant in amplitude.

6. A one-way drive between two elements adapted to turn freely with respect to each other in one direction and to be angularly locked with respect to each other for the opposed direction of relative rotation, which comprises, in combination, a disc coaxially carried by one of said elements in fixed angular relation thereto, plates movably carried by the other element in coaxial relation thereto on opposite sides of said disc, said disc and said plates being adapted to coact together in clutch-like fashion, one way clutch means interposed between said plates and said disc adapted to prevent their rotation with respect to each other in the same direction of drive and cooperating screw threads carried by said plates and said other element, respectively, adapted to cause said plates to move axially towards each other into clutch engagement with said disc when said elements are relatively rotated to render said one-way clutch means effective, said screw threads further preventing angular movement of said plates with respect to said other element when said plates and said disc are in engagement with each other.

7. A one-way drive between two elements adapted to turn freely with respect to each other in one direction and to be angularly locked with respect to each other for the opposed direction of relative rotation, which comprises, in combination, a disc coaxial with one of said elements, means splining the disc to the element to permit axial movement of the disc while maintaining it in fixed angular relation to the said element, plates coaxial with the other element on opposite sides of the disc, said disc and plates being arranged to have frictional engagement to act as a clutch, one-way clutch means having one part connected to said disc and another part keyed to said plates to prevent rotation of the disc and plates with respect to each other in the same direction of drive, and cooperating screw threads carried by said plates and said other element, respectively, adapted to cause said plates to move axially towards each other into clutch engagement with said disc when said elements are relatively rotated to render the one-way clutch means effective, said screw threads further preventing angular movement of said plates with respect to said other element when said plate and said disc are in engagement with each other.

JEAN EDOUARD ANDREAU.